(12) United States Patent
Quilici et al.

(10) Patent No.: US 11,559,004 B2
(45) Date of Patent: Jan. 24, 2023

(54) HORTICULTURAL LUMINAIRE WITH LIDAR SENSING

(71) Applicant: FLUENCE BIOENGINEERING, INC., Austin, TX (US)

(72) Inventors: Michael A. Quilici, Essex, MA (US); Richard C. Garner, Arlington, MA (US); Joseph J. Laski, Stoneham, MA (US)

(73) Assignee: FLUENCE BIOENGINEERING, INC., Austin, TX (US)

( * ) Notice: Subject to any disclaimer, the term of this patent is extended or adjusted under 35 U.S.C. 154(b) by 1005 days.

(21) Appl. No.: 16/244,220

(22) Filed: Jan. 10, 2019

(65) Prior Publication Data

US 2020/0221645 A1 Jul. 16, 2020

(51) Int. Cl.
*A01G 7/04* (2006.01)
*G01S 17/88* (2006.01)
*G01S 7/484* (2006.01)

(52) U.S. Cl.
CPC .............. *A01G 7/045* (2013.01); *G01S 7/484* (2013.01); *G01S 17/88* (2013.01)

(58) Field of Classification Search
CPC ............ A01G 9/249; A01G 9/20; G01S 7/484
See application file for complete search history.

(56) References Cited

U.S. PATENT DOCUMENTS

| 8,850,742 | B2 | 10/2014 | Dubé | |
|---|---|---|---|---|
| 2016/0113213 | A1* | 4/2016 | Berinsky | H05B 47/105 |
| | | | | 315/250 |
| 2017/0023193 | A1* | 1/2017 | Thosteson | F21V 23/003 |
| 2017/0219711 | A1 | 8/2017 | Redden et al. | |

(Continued)

FOREIGN PATENT DOCUMENTS

| CN | 105145146 B | * | 11/2018 | |
|---|---|---|---|---|
| EP | 3045033 A1 | * | 7/2016 | ............. A01G 22/00 |

(Continued)

OTHER PUBLICATIONS

Z. Bo et al., "A Multi-Wavelength Canopy LiDAR for Vegetation Monitoring: System Implementation and Laboratory-Based Tests," Procedia Environmental Sciences 10 (2011), pp. 2774-2782.
G. Wei et al., "Multi-Wavelength Canopy LiDAR for Remote Sensing of Vegetation: Design and System Performance," ISPRS Journal of Photogrammetry and Remote Sensing 69 (2012), pp. 1-9.
Hamamatsu, "Distance Linear Image Sensor S11961-01CR," Sep. 2018 (9 pages).

(Continued)

*Primary Examiner* — Magdalena Topolski
*Assistant Examiner* — Katherine Anne Kloecker

(57) ABSTRACT

A horticultural luminaire includes a first and second horticultural light sources to provide growth lighting to a plant at a first and second wavelengths. A control unit provides first lighting control signals to the first horticultural light source to modulate the first growth lighting and provides second lighting control signals to the second horticultural light source to modulate the second growth lighting. A LiDAR sensor is connected to the lighting control unit to receive the first and second control signals, and having optics to detect reflected first and second growth lighting to determine the distance from plant to sensor and a biometric property of the plant from the received first and second control signals and detected first and second reflected second growth lighting. In some implementations the LiDAR sensor and first and second horticultural light sources are integrated into the horticultural luminaire.

19 Claims, 5 Drawing Sheets

(56) References Cited

U.S. PATENT DOCUMENTS

| | | | |
|---|---|---|---|
| 2017/0311553 A1 | 11/2017 | Dobrinsky et al. | |
| 2017/0332544 A1 | 11/2017 | Conrad et al. | |
| 2018/0136330 A1* | 5/2018 | Nihei | G01S 7/4808 |
| 2018/0332676 A1* | 11/2018 | McReynolds | H05B 45/20 |
| 2019/0008096 A1* | 1/2019 | Lee | A01G 7/045 |
| 2019/0029187 A1* | 1/2019 | Brault | G01K 1/14 |
| 2019/0082610 A1* | 3/2019 | Speer | H05B 47/155 |

FOREIGN PATENT DOCUMENTS

| | | |
|---|---|---|
| WO | 2018107242 A1 | 6/2018 |
| WO | 2018201250 A9 | 11/2018 |

OTHER PUBLICATIONS

Thomas, Shane, International Search Report and Written Opinion of the International Searching Authority, for counterpart application PCT/US2020/012819, dated Mar. 25, 2020, United States Patent and Trademark Office, Alexandria, Virginia, 18 pages.

\* cited by examiner

HORTICULTURAL LUMINAIRE WITH LIDAR SENSING

TECHNICAL FIELD

This present application relates to horticultural luminaires and, more particularly, to a horticultural luminaire incorporating a LiDAR vegetation monitoring system.

BACKGROUND

Horticultural luminaires are used in enclosed agricultural facilities to provide growing light to plants. In automated farming, it is important to be able to monitor the plants to determine plant growth rate, plant maturity, and other aspects of plant health. While this may be performed manually, by having a person visually inspect the plants within the agricultural facility, it would be advantageous to provide an automated vegetation monitoring system.

SUMMARY

All examples and features mentioned below may be combined in any technically possible way.

In some implementations, a horticultural luminaire includes a horticultural luminaire that includes a first horticultural light source configured to provide first growth lighting to a plant at a first wavelength, a second horticultural light source configured to provide second growth lighting to the plant at a second wavelength, a lighting control unit configured to provide first lighting control signals to the first horticultural light source to modulate the first growth lighting and to provide second lighting control signals to the second horticultural light source to modulate the second growth lighting, a LiDAR sensor connected to the lighting control unit to receive the first control signals and to receive the second control signals, the LiDAR sensor further having optics to detect reflected first growth lighting and to detect reflected second growth lighting, and a processor configured to determine a biometric property of the plant from the received first and second control signals and detected first and second reflected second growth lighting.

In some implementations, the processor is configured to determine the biometric property of the plant by determining phase shifts of modulations of the first growth lighting and modulations of the second growth lighting based on the received first and second control signals and detected first and second reflected second growth lighting. In some implementations, the lighting control unit is further configured to control an intensity, spectrum, and duration of the growth light provided to the plant by the first and second horticultural light sources. In some implementations, the first lighting control signals modulate the first growth lighting by pulsing the first growth lighting, and in which the second growth lighting control signals modulate the first growth lighting by pulsing the second growth lighting. In some implementations, the lighting control unit is further configured to activate the first horticultural light source in intervals, and in which the first lighting control signals modulate a property of the first growth light during the intervals when the first growth lighting is turned on.

In some implementations, the luminaire further includes a first LiDAR light source configured to provide first LiDAR lighting to the plant at a third wavelength, and a second LiDAR light source configured to provide second LiDAR lighting to the plant at a fourth wavelength. In some implementations, the LiDAR sensor, the first horticultural light source, the second horticultural light source, the first LiDAR light source, and the second LiDAR light source are integrated into the horticultural luminaire. In some implementations, the third wavelength is in a Near Infrared (NIR) light spectrum between 0.7 µm-1.1 µm and the fourth wavelength is in a visible light spectrum between 555 nm-700 nm. In some implementations, the LiDAR sensor is further configured to detect fluorescence of the plant, the third wavelength is in an Ultra Violet (UV) light spectrum at approximately 360 nm or is in the visible light spectrum at approximately 436 nm, and the fourth wavelength is in a visible light spectrum between 440 nm-740 nm. In some implementations, the third wavelength is in a Near Infrared (NIR) light spectrum between 750 nm-3 µm, and the fourth wavelength is in a visible light spectrum between 400 nm-800 nm. In some implementations, the third wavelength is between 750 nm-1000 nm and the fourth wavelength is between 555 nm-750 nm. In some implementations, the third wavelength is in a Near Infrared (NIR) light spectrum between 1400 nm-1600 nm and the fourth wavelength is in the NIR light spectrum between 1000 nm-1100 nm. In some implementations, the LiDAR sensor is configured to distinguish reflected first growth lighting from reflected second growth lighting electronically and the lighting control unit is configured to modulate the first growth lighting differently than the second growth lighting, to enable the LiDAR sensor to distinguish reflected first growth lighting from reflected second growth lighting. In some implementations, the lighting control unit is configured to modulate the first growth lighting at a first frequency and to modulate the second growth lighting at a second frequency, and the LiDAR sensor is configured to discern reflected light at the first frequency from reflected light at the second frequency. In some implementations, the lighting control unit is configured to modulate the first growth lighting and the second growth lighting during alternating time intervals. In some implementations, the LiDAR sensor is configured to distinguish reflected first growth lighting from reflected second growth lighting optically. In some implementations, the luminaire further includes a communication system connected to a communication network to communicate plant measurements from the LiDAR sensor to a management system.

Further implementations disclosed herein includes a method of adjusting light produced by a horticultural luminaire. The method includes providing growth lighting to a plant by one or more horticultural light sources of the horticultural luminaire, providing first LiDAR lighting to the plant by a first LiDAR light source of the horticultural luminaire at a third wavelength, providing second LiDAR lighting to the plant by a second LiDAR light source of the horticultural luminaire at a third wavelength, detecting, by a LiDAR sensor electrically connected to the horticultural luminaire, light reflected by the plant at the third wavelength, detecting, by the LiDAR sensor, light reflected by the plant at the fourth wavelength, and determining a biometric parameter of the plant from a comparison of the light reflected by the plant at the third wavelength and light reflected by the plant at the fourth wavelength.

Further implementations disclosed herein includes a method of adjusting light produced by a horticultural luminaire. The method includes providing first growth lighting to a plant by a first horticultural light source of the horticultural luminaire at a first wavelength, providing second growth lighting to the plant by a second horticultural light source of the horticultural luminaire at a second wavelength, modulating the first growth lighting, modulating the second growth lighting, detecting, by a LiDAR sensor electrically connected to the horticultural luminaire, modulated light reflected by the plant at the first wavelength, detecting, by the LiDAR sensor, modulated light reflected by the plant at the second wavelength, and determining a biometric parameter of the plant from a comparison of the light reflected by the plant at the first wavelength and light reflected by the plant at the second wavelength.

Figure 1:
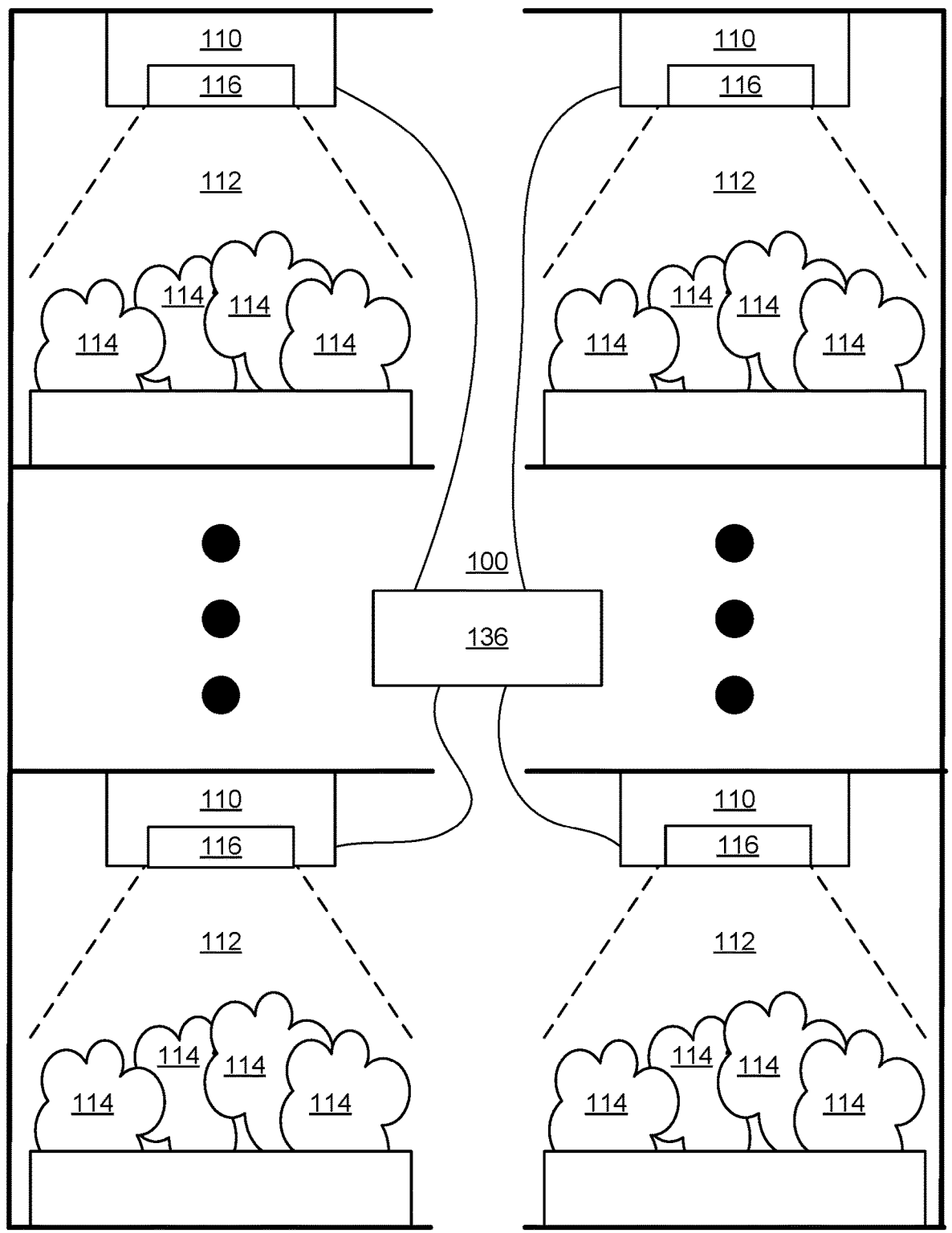
FIG. 1 is a diagram of an enclosed agricultural facility including an automated vegetation monitoring system, in accordance with some implementations of the present disclosure.

These and other features of the present implementations will be understood better by reading the following detailed description, taken together with the figures herein described. In the drawings, each identical or nearly identical component that is illustrated in various figures may be represented by a like numeral. For purposes of clarity, not every component may be labeled in every drawing.

DETAILED DESCRIPTION

This disclosure is based, at least in part, on the realization that it would be advantageous to provide an automated vegetation monitoring system by incorporating LiDAR systems in horticultural luminaires used in the agricultural facility, in which photosynthetically active radiation from the horticultural luminaire is pulsed in a manner which can be monitored by the LiDAR vegetation monitoring system to determine health status of the plants illuminated by the growth lighting. There are many challenges farmers face in producing a healthy crop, whether it be in a greenhouse, vertical farm, or outside. Factors such as mold growth, insects, and disease can reduce crop yield and quality. Early detection of a problem enables remedial action to be taken, for example to change growing conditions within the enclosed agricultural facility, to reduce the chance that the crop yield will be diminished.

Controlled environment agriculture seeks to use technology to provide optimal growing conditions for plants and is used, for example, in the production of plants intended to be used for food, medicine, or fuel. By controlling the environment, it is possible to provide optimal growing conditions throughout the development cycle of the plant. One of the aspects that is controlled in an agricultural environment of this nature is the light characteristics to which the plants are exposed. For example, the intensity, spectrum, and duration of the growth light provided to each plant may be controlled, and optionally light may be modulated such that the light is provided in intervals to save energy by providing only as much light as the plant is able to photosynthesize FIG. 1 is a diagram of an example enclosed agricultural facility 100 having a plurality of horticultural luminaires 110 providing growth light 112 to plants 114. Example enclosed agricultural facilities 100 may include vertical farming facilities, warehouses, greenhouses, hydroponic growth facilities, and numerous other agricultural facilities. To enable early detection of problems with plant growth, and to monitor overall health of the plants 114, it would be advantageous to provide a vegetation monitoring system for enclosed agricultural facility 100.

According to some implementations, an automated vegetation monitoring system includes a management system 136 and a plurality of horticultural luminaires 110, at least some of which include one or more LiDAR sensors 116 to detect characteristics of plants 114 subject to receiving light from the respective horticultural luminaire 110. In some implementations, growth light 112 output by the horticultural luminaire 110, which is modulated, is sensed by a LiDAR sensor 116 incorporated into the horticultural luminaire 110. The output from the LiDAR sensor 116, which detects the phase shift of the modulation proportional to the time of flight of the light, is used by the management system 136 to determine the health status of the plants 114, for example the height of the plants 114 being illuminated by the growth light 112, the presence of leaf blight, the Normalized Difference Vegetative Index (NDVI), the water content of the plant 114, an estimation of biomass of the plants 114, and numerous other parameters that may provide an indication of the overall health and status of the plants 114 in the vicinity of the horticultural luminaire 110.

Figure 2A:
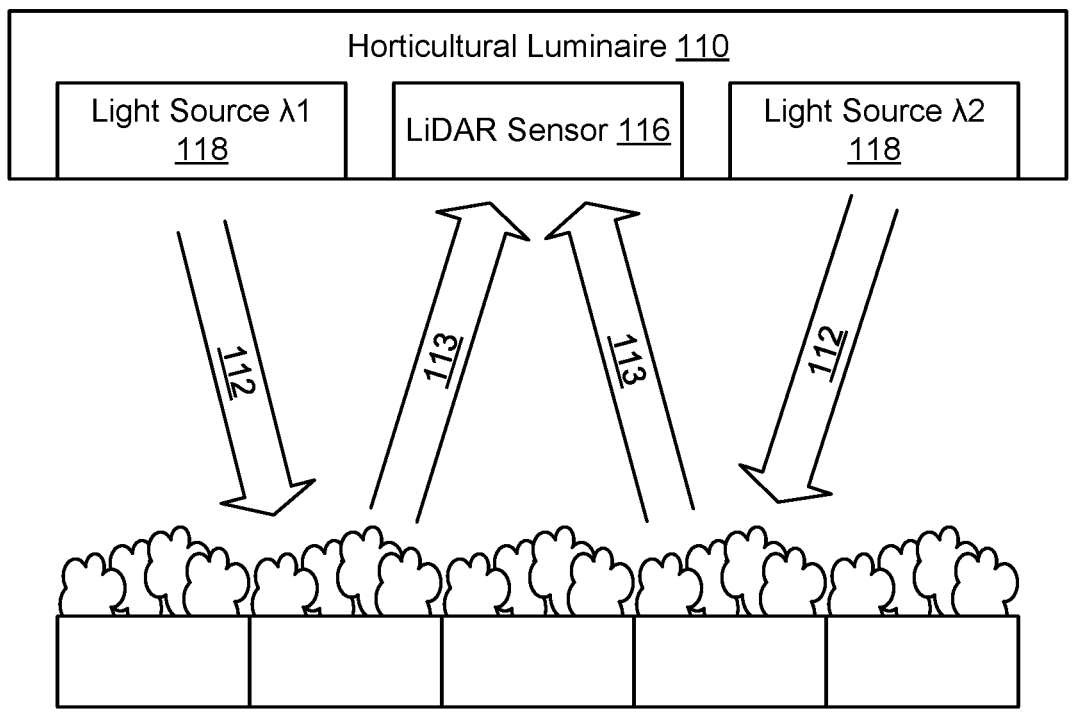
FIGS. 2A and 2B are functional block diagrams of an example horticultural luminaire disposed to provide growth lighting to a set of plants, in accordance with some implementations of the present disclosure.
Figure 2B:
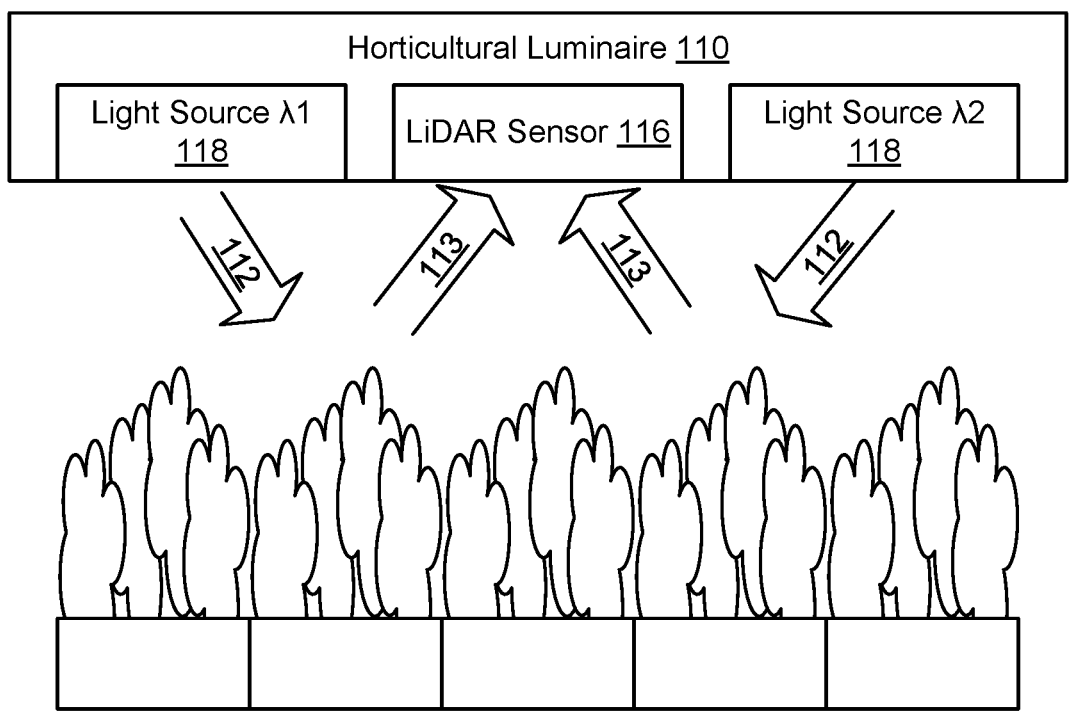

In some implementations, the LiDAR sensor 116 measures the distance from the light sources of the horticultural luminaire 110 to the plants 114, by phase shift of the modulation of the light, and uses the measured distance to determine plant height, biomass, and other relevant parameters. For example, as shown in FIG. 2A, when the plants 114 are young, the plants 114 may tend to be shorter and, accordingly, the LiDAR sensor 116 will detect a longer distance between the horticultural luminaire 110 and the plants 114. As the plants 114 mature, the height of the plants 114 may increase, thus decreasing the relative distance between the plants 114 and the horticultural luminaire 110, as shown in FIG. 2B. Accordingly, by sensing distance between the horticultural luminaire 110 and the plants 114, the LiDAR sensor 116 can detect the relative height of the plants 114 being monitored. In some implementations, by monitoring the height, biomass, and other parameters of the plants 114 over time, the plant 114 growth rate may be plotted/graphed over time allowing a farmer to anticipate future crop yield and plan when to harvest the plants 114.

There are many approaches to LiDAR including pulsed and continuous wave modulation. Pulsed (sometimes called "direct time of flight") systems use the time between the emission and reflection of the pulse to determine distance, by determining the total time-of-flight of the light from emission to detection, divided by two. Continuous wave (sometimes called "indirect time of flight") systems modulate some property of the outgoing light signal, such as the intensity, frequency, polarization of the output light, and measure the phase shift of the return signal to compute the distance from the light source to the target. Given a measured phase angle φ, the distance of a given object may be computed as:

$$d = \frac{c}{4\pi f}\varphi$$

In which d is the distance, c is the speed of light, and f is the modulation frequency. Sometimes the phase is measured indirectly, for example by measuring the relative amounts of accumulated photoelectrons in two photodiodes, one observing when the light source is "on" and the other when the light source is "off". Many commercially available short-range (few meter) LiDAR sensors 116 such as Hamamatsu product S11961, S12973, S11962, and S11963 use this type of phase detection.

Figure 3A:
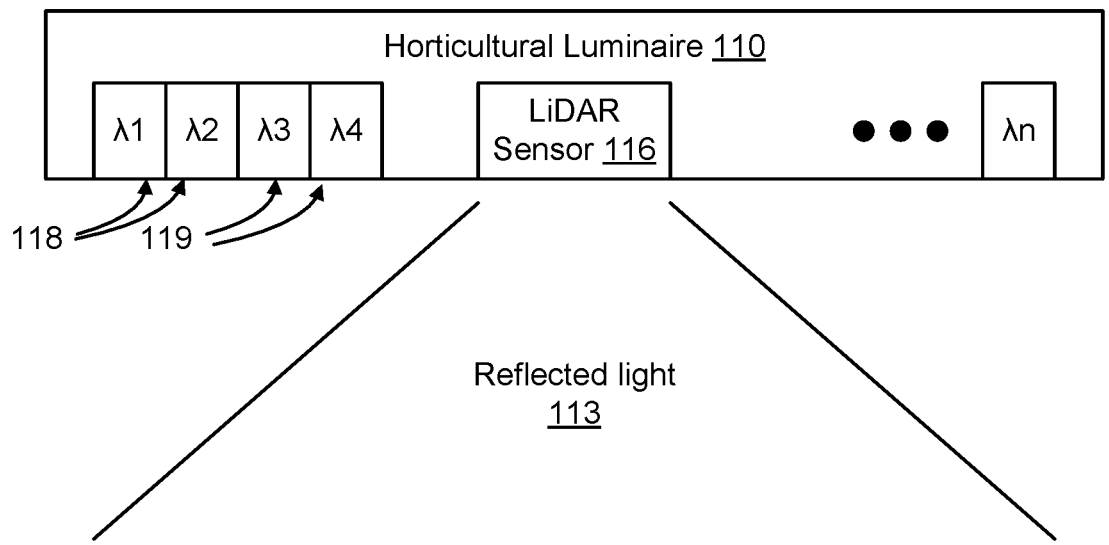
FIG. 3A is a side view functional block diagram of an example horticultural luminaire in accordance with some implementations of the present disclosure.
Figure 3B:
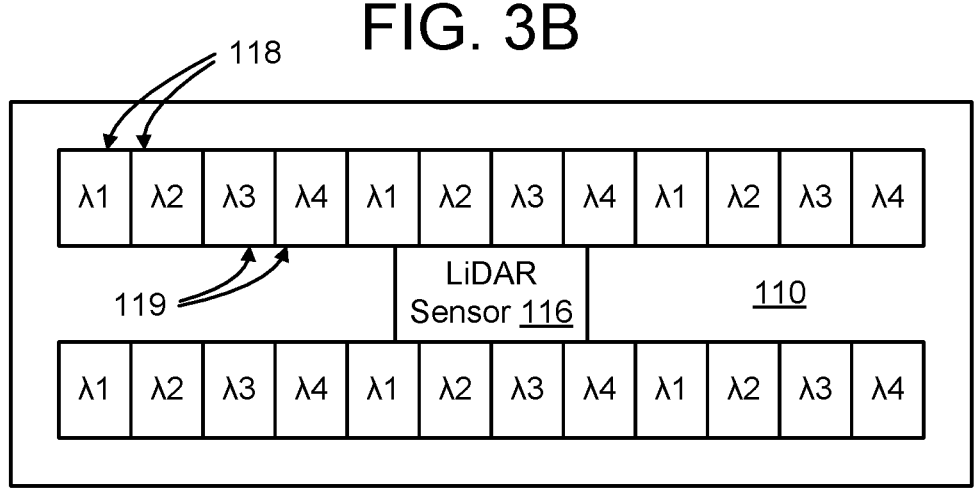
FIG. 3B is a plan view functional block diagram of the example horticultural luminaire of FIG. 3A in accordance with some implementations of the present disclosure.

In some implementations, a LiDAR sensor 116 is operatively coupled to a horticultural luminaire 110 to utilize one or more wavelength emitters (e.g., horticultural light sources 118 and/or LiDAR specific light sources 119 shown in FIGS. 3A-B) in the horticultural luminaire 110 to provide a modulated output signal. The modulated wavelength emitter, in some implementations, is the horticultural light source 118 that is used to provide the growth light 112 to the plants 114. By modulating different wavelength emitters within a horticultural luminaire 110, it is possible to produce a depth map that contains information about the reflected intensity of plants 114 and fruit at these wavelengths, which is then used to determine plant 114 health, fruit ripeness, canopy height, biomass, and other physical parameters associated with the plants 114. In some implementations the LiDAR sensor 116 is physically incorporated into the horticultural luminaire 110, and in other implementations the LiDAR sensor 116 is operatively coupled to the horticultural luminaire 110 but physically separate from the horticultural luminaire 110.

Some horticultural luminaires 110 are designed to output growth light that is pulsed at a high frequency. Pulsing growth light 112 at a high frequency can increase the rate of plant growth, or at a minimum reduce the energy needed for plant growth, due to the kinetics of rate limiting chemical steps in the photosynthesis process. In some implementations the modulated light that is used to enhance plant growth is the same as the modulation that is used for depth measurement in a phase detection or pulsed time-of-flight LiDAR system. In other implementations the pulsed growth light 112 acts as a carrier wave on which the LiDAR signal is transmitted.

Canopy height is an important metric, especially in vertical farming, because there can be significantly less room between the horticultural luminaires 110 and the plants 114. A measure of plant height, as determined from by the LiDAR sensor 116, in some implementations, is used by the management system 136 as feedback by the horticultural luminaire 110 to change the intensity, spectral composition, and other characteristics of the growth light 112 provided by the horticultural luminaire 110 to optimize growth light 112 provided to the plants 114. In some implementations, a biomass measurement determined from measurements taken by the LiDAR sensor 116 is used to provide farmers with an estimate of the yield of the crop and help decide when to harvest.

Plants with more chlorophyll have been found to have a higher infrared reflectivity than unhealthy vegetation. Accordingly, a Normalized Difference Vegetative Index (NDVI) has been defined that uses near infrared reflected intensity (NIR) (0.7 μm to 1.1 μm) and visible reflected intensity (VIS) (555 nm-700 nm) to provide a measure of plant health.

NDVI=(NIR−VIS)/(NIR+VIS)

In some implementations, a multi-spectral LiDAR sensor 116 provides a three-dimensional representation of plants 114 that includes plant health biometrics such as NDVI, in addition to canopy height, leaf area, biomass, etc.

In some implementations, ultraviolet light is emitted by the horticultural light source 118, which allows for LiDAR distance measurements using the reflected light 113, and in addition other measurements utilizing fluorescence radiation that may appear in the ultraviolet, visible, or infrared spectrum, in which both reflected light 113 and fluorescence radiation are detected by the LiDAR sensor 116. For example, ultraviolet light may be used to induce fluorescence in grapes to detect damage caused by mold. By comparing fluorescence of the plant 114 at multiple wavelengths, such as comparing fluorescence of the plant 114 when exposed to UV light at 360 nm or blue light at 436 nm, and measuring the fluorescence of the plant 114 at 440 nm-740 nm, it is possible to detect damage in some plant species caused by mold. Accordingly, in some implementations the LiDAR light source 119 emits UV light and the LiDAR sensor 116 measures the return signal from the fluorescence of the plants 114 at different wavelengths to determine health information about the plant 114 or its fruit.

In some implementations, the LiDAR light sources 119 emit light having one or more wavelengths in the Near Infrared (NIR) spectrum (750 nm-3 μm) and light having one or more wavelengths in the visible spectrum (400 nm-800 nm). For example, one possible combination includes light having a first wavelength in the NIR spectrum of between 750 nm-1000 nm and light having second wavelength in the visible spectrum of between 555 nm-750 nm. A change in reflectivity between healthy and blight-affected tomato plants, for example, occurs in the NIR spectrum of between 750 nm-1000 nm. By comparing the relative reflectivity of light at multiple wavelengths, it is possible to determine when reflectivity at one of the wavelengths is changing more than the other wavelength, to detect a change in the health of the plant 114.

Another possible combination of wavelength emitters includes using two LiDAR light sources 119 having wavelengths in the NIR spectrum, for example a first LiDAR light source 119 configured to output light at a first wavelength in the range of between 1400 nm-1600 nm, and a second LiDAR light source 119 configured to output light at a second wavelength in the range of between 1000 nm-1100 nm. Leaf blight can cause a significant change in reflectivity between 1400 nm-1600 nm, so selection of this particular combination of wavelengths enables the LiDAR sensor 116 to be used to detect leaf blight in particular plants 114. In particular, if a relative shift in reflectivity over time is detected in the 1400 nm-1600 nm band, relative to the 1000 nm-1100 nm band, the change in reflectivity in some implementations is indicative that the plant 114 being monitored has the onset of leaf blight.

LED based horticultural luminaires 110 typically exhibit FWHM (Full Width Half Maximum) spectral bandwidths of approximately 25 nm, whereas laser diodes typically exhibit FWHM spectral bandwidths of less than 10 nm. In some implementations, in addition to horticultural light sources 118 used to provide growth light 112 to plants 114, the horticultural luminaire 110 includes one or more LiDAR light sources 119, for example implemented using laser diodes designed to output light at a specific defined frequency range to more precisely excite specific plant absorption features (for example, "chlorophyll a" but not "chlorophyll b", or "beta carotene" but not "chlorophyll"). The spectral specificity enabled by laser diodes in some implementations allows for highly specific detection processes that are customizable to detect specific health characteristics for individual plant species and for different lifecycle requirements within a given plant species.

In some implementations, the LiDAR sensor 116 distinguishes reflected light 113 from different horticultural light sources 118 and/or from different LiDAR light sources 119 (collectively "wavelength emitters") electronically. In some implementations light produced by the different wavelength emitters is modulated in frequency or amplitude such that the LiDAR sensor 116 can distinguish signals generated in the LiDAR sensor 116 due to reflected light 113 from each of the wavelength emitters. In general, light modulation may include a variety of techniques, including pulse-width-modulation (PWM), amplitude modulation, frequency modulation, as well as modulating optical characteristics of the emitted light such as the polarization or emitted wavelength. For example, in some implementations the signals are modulated at different frequencies so that the LiDAR sensor 116 can distinguish the signals in Fourier space. In some implementations, the different wavelength emitters are configured to emit light in different time windows such that the LiDAR sensor 116 receives reflected light 113 of only one wavelength at a time. By time-multiplexing the production of light to be detected by the LiDAR sensor 116, it is possible for the LiDAR sensor 116 to disambiguate signals associated with each of the multiple wavelength emitters.

In other implementations, the LiDAR sensor 116 distinguishes reflected light 113 from different wavelength emitters optically. In some implementations, the LiDAR sensor 116 includes a camera and incorporates one or more filters (bandpass, edge, polarization, etc.) to block unwanted wavelengths. In some implementations, in which the LiDAR sensor 116 is required to detect two wavelengths, the camera includes two detectors and a dichroic beam-splitter, such that reflected light 113 received by the LiDAR sensor 116 having a first wavelength is directed to a first detector and reflected light 113 received by the LiDAR sensor 116 having a second wavelength is directed to the second detector. Alternatively, in some implementations the camera includes two detectors and incorporates a polarization beam-splitter, such that light having a first polarization is directed to a first detector and light having a second polarization is directed to the second detector. In some implementations, a Bayer filter is used such that the pixels of the camera detector incorporate small filters to transmit only the desired signals. A Bayer filter mosaic is a color filter array (CFA) for arranging RGB color filters on a square grid of photosensors.

In some implementations, the horticultural luminaire 110 has wavelength emitters such as horticultural light sources 118 and LiDAR light sources 119 that collectively emit modulated light (continuous wave or pulsed) at multiple wavelengths. The reflection of the light (reflected light 113) is detected by an imaging camera, and a LiDAR processing system 126 computes the distance to the target plants 114 by measuring the phase change or time-of-flight of the return signal. In some implementations, the horticultural light sources 118 that are used to provide growth lighting 112 to the plants 114 are modulated. In this manner, multiple wavelength emitters are modulated within the fixture to measure depth and reflectivity at multiple wavelengths in order to measure plant biometrics such as NDVI. In some implementations, the horticultural luminaire 110 incorporates non-growing emitters of specific wavelengths (LiDAR light sources 119) that are used solely for the purpose of depth imaging and computing plant biometrics.

Figure 5:
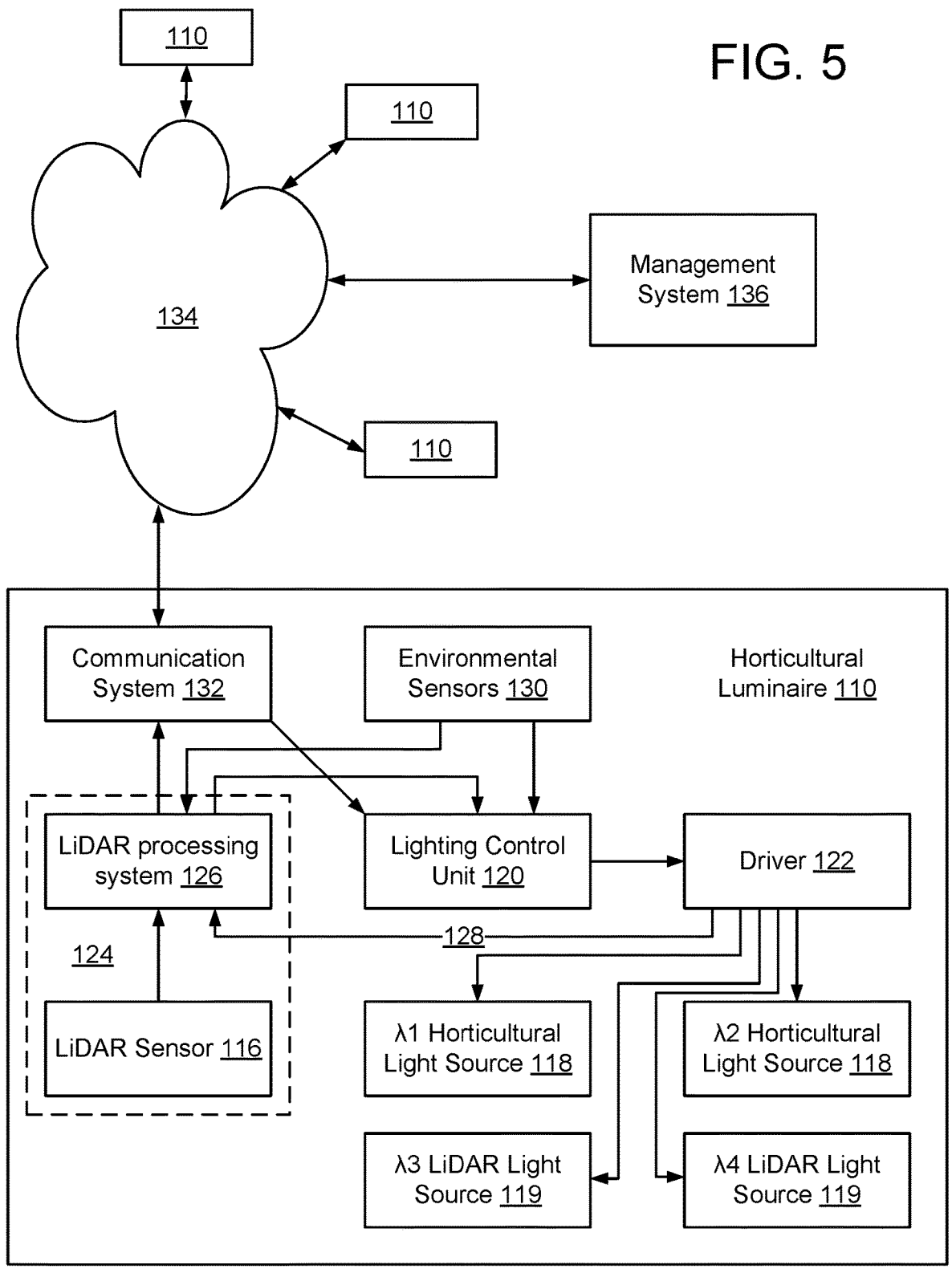
FIG. 5 is a functional block diagram of an example automated vegetation monitoring system including an example horticultural luminaire in accordance with some implementations of the present disclosure.

In some implementations, the LiDAR sensor 116 is supplemented by one or more environmental sensors 130 (as shown in FIG. 5), such as temperature sensors, humidity sensors, sound sensors, and UV/Visible/NIR ambient light sensors, to detect other ambient characteristics of the environment in the vicinity of the plants 114. The additional information provided by environmental sensors 130 is used, in some implementations, to determine other characteristics of the plants 114 such as the leaf temperature, which is correlated with leaf respiration and plant growth. Having temperature information may also be used for occupancy detection, fire prevention, and to determine operational characteristics of the HVAC system in use by the enclosed agricultural facility 100.

FIGS. 3A and 3B show an example horticultural luminaire 110 having a plurality of horticultural light sources 118 providing growth light 112 of multiple wavelengths $\lambda 1$ and $\lambda 2$, and a plurality of LiDAR light sources 119 providing LiDAR specific light at wavelengths $\lambda 3$ and $\lambda 4$. In some implementations, as shown in FIGS. 3A-3B, the horticultural luminaire 110 has a single LiDAR sensor 116 to detect reflected light 113 reflected by plants 114. Light detected by LiDAR sensor 116 is processed to determine biometric characteristics of plants 114 as described in greater detail herein. Although FIGS. 3A-3B show the LiDAR sensor 116 physically incorporated into horticultural luminaire 110, in some implementations the LiDAR sensor 116 is physically separate from the horticultural luminaire 110 and electronically connected to receive signals describing the light produced by the horticultural luminaire 110, to enable the LiDAR sensor 116 output to be used to determine biometric and depth information about plants 114. Although FIGS. 3A-3B show that the horticultural light sources 118 and LiDAR light sources 119 each emit two different wavelengths, in general both light sources 118, 119 may emit light of any number of wavelengths.

Figure 4A:
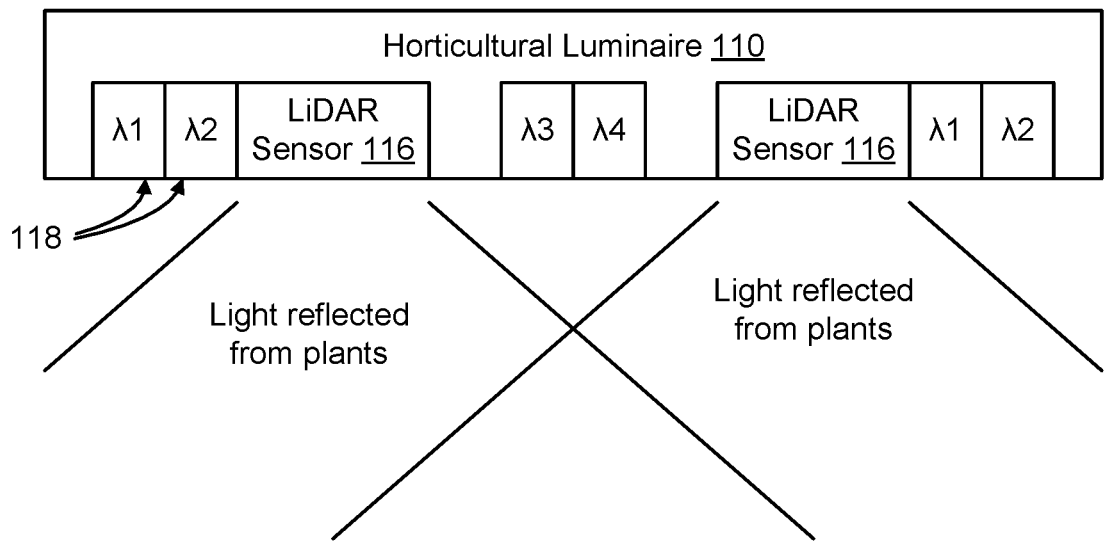
FIG. 4A is a side view functional block diagram of another example horticultural luminaire in accordance with some implementations of the present disclosure.
Figure 4B:
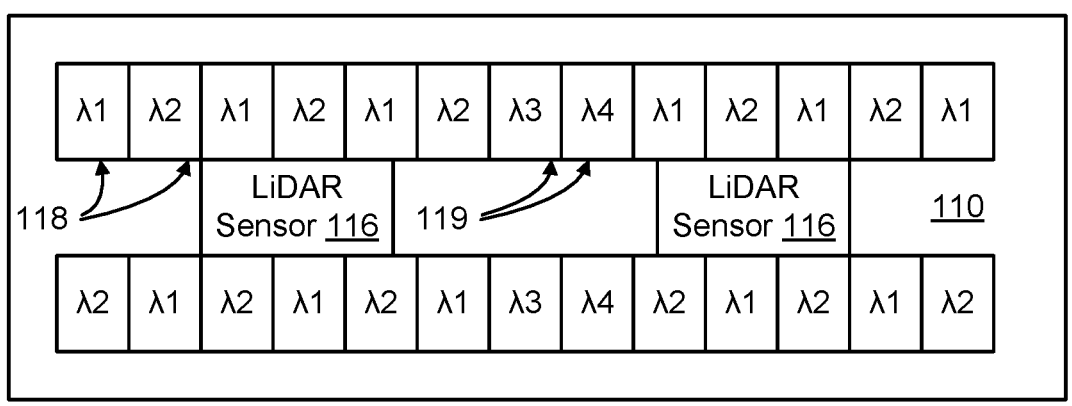
FIG. 4B is a plan view functional block diagram of the example horticultural luminaire of FIG. 4A in accordance with some implementations of the present disclosure.

FIGS. 4A and 4B show an example horticultural luminaire 110 having a plurality of horticultural light sources 118 providing growth light 112 of multiple wavelengths $\lambda 1$- and $\lambda 2$, and a plurality of LiDAR light sources 119 providing LiDAR specific light at wavelengths $\lambda 3$ and $\lambda 4$. In some implementations, as shown in FIGS. 4A-4B, the horticultural luminaire 110 has multiple LiDAR sensors 116 to detect reflected light 113 reflected by plants 114. Light detected by LiDAR sensors 116 is processed to determine biometric characteristics of plants 114 as described in greater detail herein. Although FIGS. 4A-4B show the LiDAR sensors 116 physically incorporated into horticultural luminaire 110, in some implementations one or more of the LiDAR sensors 116 is physically separate from the horticultural luminaire 110 and electronically connected to receive signals describing the light produced by the horticultural luminaire 110, to enable the LiDAR sensor 116 output to be used to determine biometric and depth information about plants 114. Although FIGS. 4A-4B show that the horticultural light sources 118 and LiDAR light sources 119 each emit two different wavelengths, in general both light sources 118, 119 may emit light of any number of wavelengths.

FIG. 5 is a functional block diagram of an example automated vegetation monitoring system including an example horticultural luminaire 110 in accordance with some implementations of the present disclosure. As shown in FIG. 5, in some implementations a horticultural luminaire 110 includes a plurality of horticultural light sources 118 providing growth light 112 at multiple wavelengths. In the example shown in FIG. 5, two horticultural light sources 118 are shown to provide growth light 112 at a first wavelength λ1 and growth light 112 at a second wavelength λ2. In some implementations more than two horticultural light sources 118 are included in horticultural luminaire 110 to provide growth light 112 in some implementations one, two, or more LiDAR specific light sources 119, such as laser light sources, are included in horticultural luminaire 110 to provide light specific for sensing by LiDAR sensor 116.

Light provided by horticultural light sources 118 and/or LiDAR light sources 119 is controlled by lighting control unit 120. Lighting control unit 120 provides signals to driver 122 to cause driver 122 to turn horticultural light sources 118 and/or LiDAR light sources 119 on and off, control intensity of horticultural light sources 118 and/or LiDAR light sources 119, and in some implementations to modulate light produced by the horticultural light sources 118 and/or LiDAR light sources 119, to enable the light produced by horticultural light sources 118 and/or LiDAR light sources 119 to be detected and processed by the LiDAR system 124 included in horticultural luminaire 110.

As discussed in greater detail herein, LiDAR system 124 includes a LiDAR sensor 116 and LiDAR processing system 126. In some implementations, the LiDAR sensor 116 is a commercially available sensor such as the TI-OPT8241 available from Texas Instruments or one or more of the S11961, S11962, S11963, and S12973 LiDAR sensors 116 from Hamamatsu. All of these devices are commercially available 3D imaging systems which incorporate an indirect time of flight phase detection scheme at each pixel of a 2D sensor plane. In some implementations LiDAR processing system 126 is implemented as control logic configured to enable light received by LiDAR sensor 116 to be processed to determine reflectivity characteristics of multiple wavelengths of light produced by horticultural light sources 118 and LiDAR light sources 119. LiDAR processing system 126 uses the time-of-flight of the reflected light 113 to determine distance between the horticultural luminaire 110 and the plants 114, to thus determine the height of the plants 114. LiDAR processing system 126 uses the relative reflectivity of the multiple wavelengths to detect other characteristics of the plants 114 such as the presence of blight, the amount of chlorophyll in the plant leaves, and other plant health metrics as discussed in greater detail herein.

In some implementations, as shown in FIG. 5, output of driver 122 to horticultural light sources 118 and/or LiDAR light sources 119 is provided on communication channel 128 to LiDAR processing system 126 to enable LiDAR processing system 126 to know when horticultural light sources 118 and/or LiDAR light sources 119 are activated, and to enable any modulation of horticultural light sources 118 and/or LiDAR light sources 119 to be known by LiDAR processing system 126. Although communication channel 128 is shown as separate from the channels used by driver 122 to control horticultural light sources 118 and/or LiDAR light sources 119, in some implementations the same channel is used to communicate control signals to horticultural light sources 118 and/or LiDAR light sources 119 and to LiDAR processing system 126.

In some implementations, horticultural luminaire 110 includes one or more environmental sensors 130 to detect ambient conditions in the vicinity of the horticultural luminaire 110. In some implementations, example environmental sensors 130 include one or more of a temperature sensor, a humidity sensor, a UV/visible/NIR ambient light sensor, and an audio sensor. In some implementations, the reflectivity comparison at each wavelength produced by horticultural light sources 118 and/or LiDAR light sources 119 is used in connection with input from the environmental sensors 130 to determine one or more plant 114 biometrics such as NDVI.

In some implementations, the horticultural luminaire 110 includes a communication system 132 to transmit detected plant biometrics on a communication network 134 to the management system 136 for the enclosed agricultural facility 100. In some implementations, management system 136 aggregates plant biometric updates from multiple horticultural luminaires 110 in the enclosed agricultural facility 100 and summarizes the determined biometric information for presentation to a person monitoring the enclosed agricultural facility. By providing management system 136 with plant biometric information, as detected by LiDAR system 124, it is possible to determine when to harvest the plants 114 and to determine whether the horticultural luminaires 110 are providing optimal lighting conditions throughout the development cycle of the plants 114, without requiring a person to manually visually inspect the plants 114. By providing early detection of diseases such as plant blight, it is possible to prevent crop loss thus increasing the productivity of the enclosed agricultural facility 100.

In some implementations, communication system 132 is also configured to receive light adjustment instructions via communication network 134 from management system 136 to control operation of the horticultural light sources 118, to thereby change the quality of growth light 112 produced by horticultural light sources 118. For example, as shown in FIG. 5, in some implementations, communication system 132 is connected to lighting control unit 120, such that light adjustment instructions received by communication system 132 over communication network 134 are passed to lighting control unit 120 and used by lighting control unit 120 to adjust parameters used by driver 122 to activate light sources 118. In this manner the intensity of the horticultural light sources 118 is adjusted, the amount of time each horticultural light source 118 is active is adjusted, or other characteristics of the light produced by horticultural light sources 118 is adjusted.

The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more non-transitory tangible computer-readable storage medium readable by the processor (including volatile and non-volatile memory and/or storage elements), one or more input devices, and/or one or more output devices.

The computer program(s) may be implemented using one or more high level procedural or object-oriented programming languages to communicate with a computer system; however, the program(s) may be implemented in assembly or machine language, if desired. The language may be compiled or interpreted.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including", and "having" are intended to be inclusive and mean that there may be additional elements other than the listed elements.

Although the methods and systems have been described relative to specific implementations thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A horticultural luminaire, comprising:
a first horticultural light source configured to provide first growth lighting to a plant at a first wavelength;
a second horticultural light source configured to provide second growth lighting to the plant at a second wavelength;
a lighting control unit configured to provide first lighting control signals to the first horticultural light source to modulate the first growth lighting and to provide second lighting control signals to the second horticultural light source to modulate the second growth lighting;
a LiDAR sensor connected to the lighting control unit to receive the first control signals and to receive the second control signals, the LiDAR sensor further having optics to detect reflected first growth lighting and to detect reflected second growth lighting; and
a processor configured to determine a biometric property of the plant from the received first and second control signals and detected first and second reflected second growth lighting by, at least, determining phase shifts of modulations of the first growth lighting and modulations of the second growth lighting based on the received first and second control signals and detected first and second reflected second growth lighting.

2. The horticultural luminaire of claim 1, wherein the lighting control unit is further configured to control an intensity, spectrum, and duration of the growth light provided to the plant by the first and second horticultural light sources.

3. The horticultural luminaire of claim 1, wherein the first lighting control signals modulate the first growth lighting by pulsing the first growth lighting, and wherein the second growth lighting control signals modulate the second growth lighting by pulsing the second growth lighting.

4. The horticultural luminaire of claim 3, wherein the lighting control unit is further configured to activate the first horticultural light source in intervals, and wherein the first lighting control signals modulate a property of the first growth light during the intervals when the first growth lighting is turned on.

5. The horticultural luminaire of claim 1, further comprising:
a first LiDAR light source configured to provide first LiDAR lighting to the plant at a third wavelength; and
a second LiDAR light source configured to provide second LiDAR lighting to the plant at a fourth wavelength.

6. The horticultural luminaire of claim 5, wherein the LiDAR sensor, the first horticultural light source, the second horticultural light source, the first LiDAR light source, and the second LiDAR light source are integrated into the horticultural luminaire.

7. The horticultural luminaire of claim 5, wherein:
the third wavelength is in a Near Infrared (NIR) light spectrum between 0.7 µm-1.1 µm; and
the fourth wavelength is in a visible light spectrum between 555 nm-700 nm.

8. The horticultural luminaire of claim 5, wherein:
the LiDAR sensor is further configured to detect fluorescence of the plant;
the third wavelength is in an Ultra Violet (UV) light spectrum at 360 nm or is in the visible light spectrum at 436 nm; and
the fourth wavelength is in a visible light spectrum between 440 nm-740 nm.

9. The horticultural luminaire of claim 5, wherein:
the third wavelength is in a Near Infrared (NIR) light spectrum between 750 nm-3 µm; and
the fourth wavelength is in a visible light spectrum between 400 nm-800 nm.

10. The horticultural luminaire of claim 9, wherein the third wavelength is between 750 nm-1000 nm and the fourth wavelength is between 555 nm-750 nm.

11. The horticultural luminaire of claim 5, wherein:
the third wavelength is in a Near Infrared (NIR) light spectrum between 1400 nm-1600 nm; and
the fourth wavelength is in the NIR light spectrum between 1000 nm-1100 nm.

12. The horticultural luminaire of claim 1, wherein the LiDAR sensor is configured to distinguish reflected first growth lighting from reflected second growth lighting electronically and the lighting control unit is configured to modulate the first growth lighting differently than the second growth lighting, to enable the LiDAR sensor to distinguish reflected first growth lighting from reflected second growth lighting.

13. The horticultural luminaire of claim 12, wherein the lighting control unit is configured to modulate the first growth lighting at a first frequency and to modulate the second growth lighting at a second frequency, and the LiDAR sensor is configured to discern reflected light at the first frequency from reflected light at the second frequency.

14. The horticultural luminaire of claim 12, wherein the lighting control unit is configured to modulate the first growth lighting and the second growth lighting during alternating time intervals.

15. The horticultural luminaire of claim 1, wherein the LiDAR sensor is configured to distinguish reflected first growth lighting from reflected second growth lighting optically.

16. The horticultural luminaire of claim 1, further comprising a communication system connected to a communication network to communicate plant measurements from the LiDAR sensor to a management system.

17. A method of adjusting light produced by a horticultural luminaire, the method comprising:
providing growth lighting to a plant by one or more horticultural light sources of the horticultural luminaire;
providing first LiDAR lighting to the plant by a first LiDAR light source of the horticultural luminaire at a third wavelength;
providing second LiDAR lighting to the plant by a second LiDAR light source of the horticultural luminaire at a fourth wavelength;
wherein the third wavelength is in a Near Infrared (NIR) light spectrum between 1400 nm-1600 nm, and the fourth wavelength is in the NIR light spectrum between 1000 nm-1100 nm, detecting, by a LiDAR sensor electrically connected to the horticultural luminaire, light reflected by the plant at the third wavelength;

detecting, by the LiDAR sensor, light reflected by the plant at the fourth wavelength;

and determining a biometric parameter of the plant from a comparison of the light reflected by the plant at the third wavelength and light reflected by the plant at the fourth wavelength.

18. A method of adjusting light produced by a horticultural luminaire, the method comprising:

providing first growth lighting to a plant by a first horticultural light source of the horticultural luminaire at a first wavelength;

providing second growth lighting to the plant by a second horticultural light source of the horticultural luminaire at a second wavelength;

modulating the first growth lighting; modulating the second growth lighting;

detecting, by a LiDAR sensor electrically connected to the horticultural luminaire, modulated light reflected by the plant at the first wavelength;

detecting, by the LiDAR sensor, modulated light reflected by the plant at the second wavelength; and determining a biometric parameter of the plant from a comparison of the light reflected by the plant at the first wavelength and light reflected by the plant at the second wavelength by, at least, determining phase shifts of modulations of the first growth lighting and modulations of the second growth lighting based on the received first and second control signals and detected first and second reflected second growth lighting.

19. The method of claim 18, further comprising:

providing first LiDAR lighting to the plant by a first LiDAR light source of the horticultural luminaire at a third wavelength, the third wavelength being in a Near Infrared (NIR) light spectrum between 1400 nm-1600 nm; and providing second LiDAR lighting to the plant by a second LiDAR light source of the horticultural luminaire at a fourth wavelength, the fourth wavelength being in the NIR light spectrum between 1000 nm-1100 nm.

* * * * *